United States Patent
US 6,584,645 B2
Migli
Jul. 1, 2003

(54) BREAKING DEVICE FOR FURNITURE DOORS WITH A HORIZONTAL PIVOTAL MOUNTING

(75) Inventor: Carlo Migli, Lecco (IT)

(73) Assignee: Agostino Ferrari S.p.A. (IT)

(*) Notice: Subject to any disclaimer, the term of this patent is extended or adjusted under 35 U.S.C. 154(b) by 8 days.

(21) Appl. No.: 09/950,405

(22) Filed: Sep. 11, 2001

(65) Prior Publication Data

US 2002/0032951 A1 Mar. 21, 2002

(30) Foreign Application Priority Data

Sep. 18, 2000 (IT) .................................. MI20000525 U
Mar. 2, 2001 (IT) .................................. MI20010114 U

(51) Int. Cl.[7] .......................... E05C 17/64; E05D 11/08
(52) U.S. Cl. .............................. 16/341; 16/337; 403/350
(58) Field of Search .......................... 16/227, 337, 341; 403/350

(56) References Cited

U.S. PATENT DOCUMENTS

| | | | | |
|---|---|---|---|---|
| 4,734,955 A | * | 4/1988 | Connor | 16/332 |
| 5,276,945 A | * | 1/1994 | Matsumura | 16/337 |
| 5,312,158 A | * | 5/1994 | Wittig et al. | 297/362 |
| 5,598,607 A | * | 2/1997 | Katagiri | 16/337 |
| 5,745,567 A | * | 4/1998 | Middleton | 379/433.13 |
| 5,772,351 A | * | 6/1998 | Ching | 403/111 |
| 6,125,507 A | * | 10/2000 | Katoh | 16/329 |
| 6,163,928 A | * | 12/2000 | Chung | 16/342 |
| 6,314,614 B1 | * | 11/2001 | Kuehl | 16/342 |
| 6,421,878 B1 | * | 7/2002 | Kaneko et al. | 16/330 |

* cited by examiner

Primary Examiner—Gary S. Hartmann
(74) Attorney, Agent, or Firm—Shlesinger, Fitzsimmons & Shlesinger

(57) ABSTRACT

A device for a braked movement of furniture doors in particular with a horizontal rotation axis comprises two attachment pieces (11, 12, 211, 212, 311, 312, 411, 412) that are movable in opposite directions around a common rotation axis (13, 213, 313, 413) in a free manner in one rotation direction and against a resisting force of a friction joint in the other rotation direction. Between an attachment piece and the friction joint the device comprises a first surface (28, 228, 328, 428) and a second surface (27, 227, 327, 427) facing each other to delimit a space therebetween in which a wedging element (26, 226, 326, 426) is disposed. The extension of the facing surfaces and/or the shape of the wedging element between them are of such a nature that the wedging element tends to fixedly fit between said facing surfaces causing them to rotate integrally with each other when rotation of the two attachment pieces takes place in the direction that must involve a braked movement.

19 Claims, 5 Drawing Sheets

BREAKING DEVICE FOR FURNITURE DOORS WITH A HORIZONTAL PIVOTAL MOUNTING

BACKGROUND OF THE INVENTION

The present invention relates to a braking device for furniture doors having a horizontal pivotal mounting, such as flap doors and the like.

On construction of elements for furniture it is often necessary to open a door using a single- or multi-pivot kinematic mechanism disposed in such a manner that the instantaneous-rotation axis will be horizontal. Classical examples are flap doors and some hanging furniture (wall cabinets for kitchens, for example) where opening of the door upwardly instead of laterally as in normal applications can be convenient.

In the case of an opening along a horizontal rotation axis however, there is a problem because the centre of gravity moves on a vertical plane so that the door tends to drop towards its position of maximum opening (in the case of flap doors) or its closing position (in the case of furniture in which the door rotates upwardly). Therefore, for these applications the door movement is required to be balanced so that said movement is at all events smooth and uniform also in the direction of action of the door weight or even to enable the door itself to keep a steady position irrespective of its location, exactly as it happens for doors with a vertical rotation axis. For this reason different cam systems are used and known in the art which utilise springs or gas cylinders to balance the door weight.

If the door weight is not too heavy, the balancing mechanism can be advantageously replaced by a "passive" friction joint which is cheaper and limits itself to brake the weight-force action. In this case a problem exists because it is necessary to make a cheap and stout mechanism of the one-way type, i.e. in which the movement is braked in the direction of action of the door weight, and which is instead free in the opposite direction so that a useless effort is not required. Systems using ratchet gears and toothed surfaces have been suggested in the known art which are however rather expensive, sometimes noisy, and often provided with excessive mechanical slacks.

It is a general aim of the present invention to supply a braking device which, applied to a pivot of the kinematic mechanism of a hinge or the rotation axis of a balancing rod, produces a rotation-resistant adjustable torque acting in one rotation direction alone, with a rotation in the opposite direction practically clear of frictions. All that at reduced costs, with a stout and reliable structure and minimum operating slacks.

SUMMARY OF THE INVENTION

In view of the above aim, in accordance with the invention, a device for a braked movement in furniture doors in particular with a horizontal rotation axis has been conceived which comprises two attachment pieces that are movable in opposite directions around a common rotation axis in a free manner in one rotation direction and against a resisting force obtained by a friction joint in the other rotation direction, the friction joint being connected to one of the two attachment pieces through a one-way wedging device, characterised in that the wedging device comprises a first surface integral with the attachment piece and a second surface integral with the joint, the two surfaces facing each other to delimit a space therebetween in which a selective-wedging element is disposed, the extension of the facing surfaces and/or the shape of the wedging element between them being of such a nature that the wedging element tends to fixedly fit between said facing surfaces so that they are caused to rotate integrally with each other when rotation of the two attachment pieces takes place in the direction that must involve a braked movement.

BRIEF DESCRIPTION OF THE DRAWINGS

For better explaining the innovatory principles of the present invention and the advantages it offers over the known art, possible embodiments applying said principles will be given hereinafter by way of example, with the aid of the accompanying drawings. In the drawings.

DETAILED DESCRIPTION OF THE INVENTION

Figure 1:
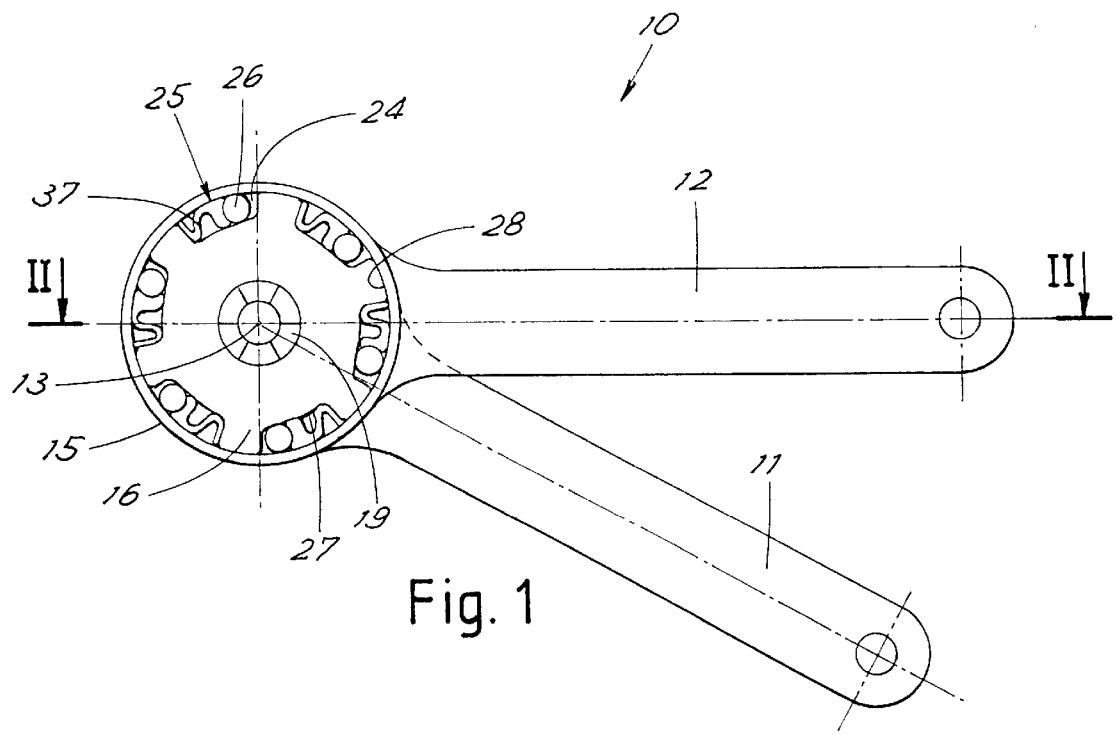
FIG. 1 is a front view of a device in accordance with the invention, with a lid removed to show the inner mechanism.

With reference to the drawings, a "balancing" device made in accordance with the present invention and generally identified by reference numeral 10 is shown in FIG. 1. Device 10 comprises two attachment pieces or lever elements 11, 12, pivotally mounted in mutual relationship to rotate about an axis 13 and designed to be fastened to the opening kinematic mechanism of a door of a piece of furniture, as clarified in the following.

Figure 2:
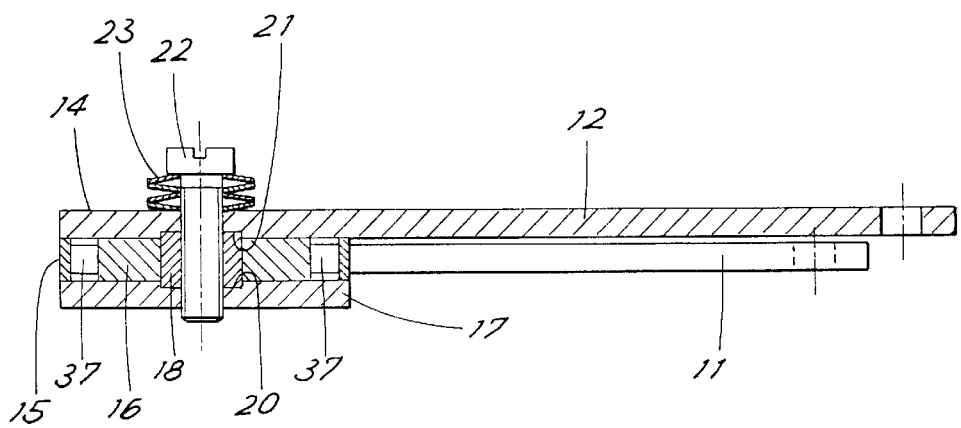
FIG. 2 shows a section taken along line II—II in FIG. 1.

As clearly shown in FIG. 2 as well, the lever element 11 substantially consists of a plate enlarged at one end to form a bottom disc 14. The lever element 12 has one end forming a circular crown 15 the bottom of which is made up of the bottom disc 14.

Received in the circular seat thus formed is an element or central disc 16 having a slightly greater thickness than the thickness of crown 15. The disc-shaped element 16 is enclosed in the seat by a lid 17 (removed in FIG. 1 for the sake of clarity).

The lid 17 and disc 14 are axially connected with each other by means of an insert or hollow pin 18 freely passing through the central disc 16. The hollow pin has radial recesses 19 at the two ends thereof that match with complementary radial recesses 20, 21 that are present on the lid and disc so that the latter axially rotate together while a small movement between the lid 17 and disc 14 close to and away from each other is allowed.

A screw 22 passes through the disc 14 and pin 18 and is screwed down on lid 17. An elastic element 23 (in particular a spring) is placed between the screw 22 head and the disc 14 to elastically push the disc and lid against each other and thus sandwich the central disc 16 therebetween with an adjustable force. In this way, by adjusting screw 22 it is possible to vary the force by which the side disc, central disc and lid are packed and therefore vary the force necessary to rotate the central disc relative to the lever 11, overcoming the sliding friction. Thus a friction joint is made. The friction surfaces can be worked and/or made using a material adapted to obtain the desired resistance to sliding.

Hollow spaces or channels 24 (advantageously formed in the central disc) are made between the crown 15 and central disc 16 to receive substantially one-way wedging elements 25 between the crown 15 and central disc 16. Due to elements 25, the mutual rotation of the two levers 11, 12 around axis 13 takes place freely in one way (that in which fitting of elements 25 does not occur) and with a friction imposed by adjustment of screw 22 in the opposite way (that in which fitting of elements 25 occurs).

The wedging elements 25 substantially involve a restrained fitting that can be referred to as of the "wedge" type as they are designed to be inserted between the facing surfaces of the central disc and crown, on rotation of the device in the braking direction.

In the embodiment shown in FIGS. 1 and 2 in order to achieve a wedge fitting, the hollow spaces 24 have decreasing radial width along their extension (in a clockwise direction in FIG. 1) at least over a portion thereof. Received within the seat is a locking element (that in the embodiment of FIG. 1 consists of a cylinder 26 of a diameter of an intermediate size between the minimum and maximum widths of the hollow space), which is pushed by an elastic element 37 towards the hollow-space region having a smaller width. The rollers and the elastic thrust elements have a slightly smaller height than the thickness of crown 15 to prevent the side friction from interfering with sliding of same.

In the particular embodiment, in order to obtain a variation in width, the hollow spaces (circumferentially distributed at regular intervals) substantially consist of the inner cylindrical surface 28 of crown 15 (which has a circular section concentric with axis 13) and of cavities formed in the edge of disc 16 and identifying a surface 27 which gradually approaches crown 15 at least at its end portion (in a clockwise direction in FIG. 1). Surface 27 is not required to have a constant approaching over the whole extension of the hollow space. For instance, advantageously, the first part of surface 27 (where the thrust element 37 is present) may have a cylindrical extension with a constant diameter having its centre at 13, whereas the second part may still have a cylindrical extension with a beginning tangent to the circumference of the first part but in which the distance of its centre from axis 13 becomes increasingly greater.

It is clear that the clockwise rotation of the crown (i.e. decreasing of the angle between levers 11, 12) produces the restrained fitting of cylinders 26 between the two facing surfaces 27, 28 of the disc and crown. This makes the crown and central disc substantially integral, so that the lever movement is hindered by friction of the braking means consisting of the facing and sandwiched surfaces of the central disc 16, outer disc 14 and lid 17. On rotation in the opposite way, the cylinders 26 are pushed to the region of greater width of the hollow spaces and the lever movement becomes free.

As a person skilled in the art can easily understand, the sliding surfaces can be made (in terms of material and working) in a manner adapted to promote the fitting and release effect depending on the direction of rotation of the levers.

Figure 3:
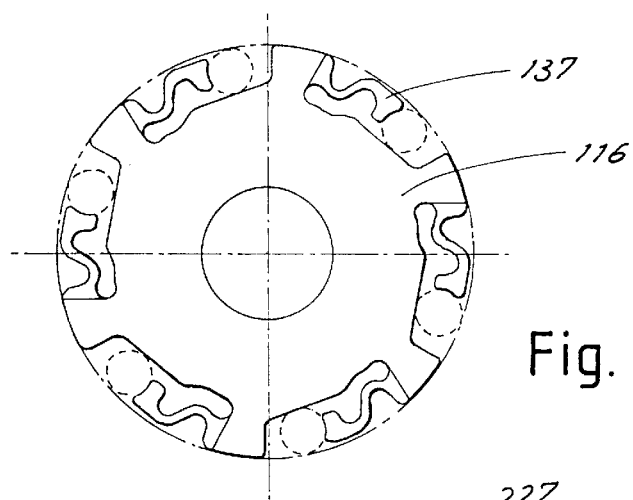
FIG. 3 shows a detail of a first alternative embodiment of the device in FIG. 1.

In FIG. 1 the thrust elements 37 for the rollers are made as separate portions. In the alternative embodiment in FIG. 3 such thrust elements (denoted at 137) are instead of one piece construction with the central disc (identified by 116). This embodiment is particularly advantageous when the disc is of moulded plastic material and simplifies assembling of the device.

Figure 4:
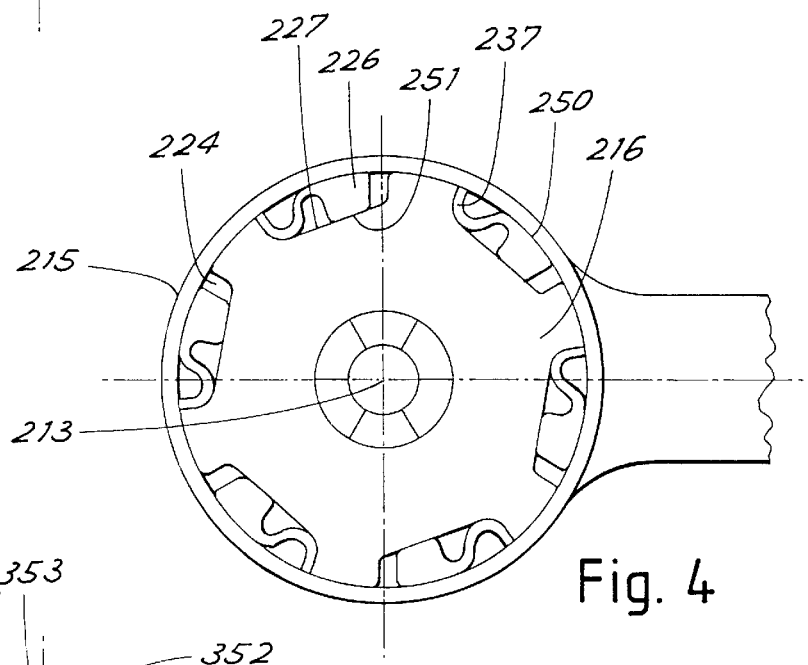
FIG. 4 shows a detail of a second alternative embodiment of the device in FIG. 1.

In a further possible embodiment, shown in FIG. 4, the rollers are replaced by true wedges 226, rigid or not with the central disc (identified by 216). In this case, if friction between the outer surface 250 of the wedge and the inner surface of the crown is greater than friction between the outer surface 251 of the wedge and the surface 227 of the disc, by rotating the crown anticlockwise the wedge, held in place by spring 237, exerts an increasing radial thrust tending to make the disc and crown integral with each other.

Figure 5:
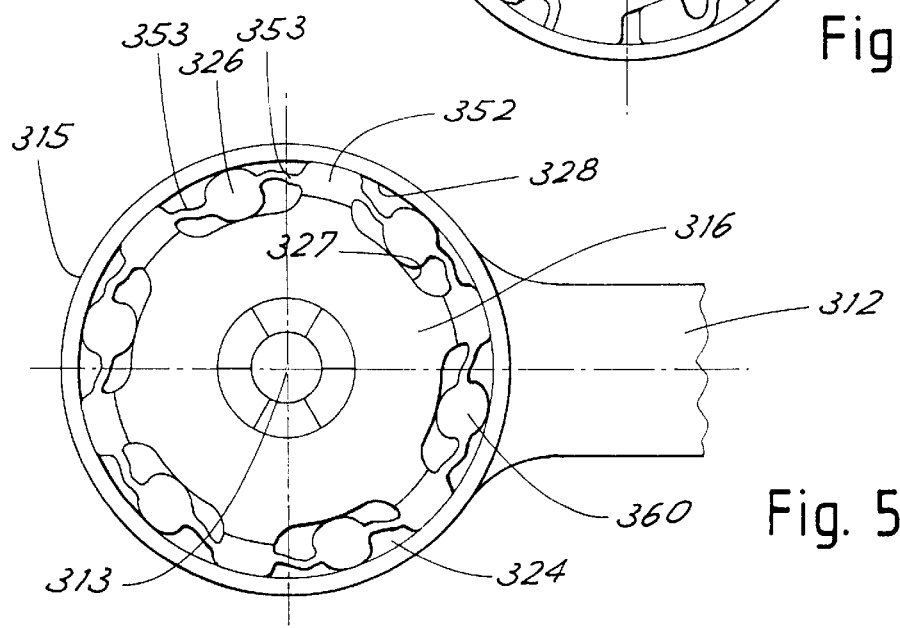
FIG. 5 shows a detail of a third alternative embodiment of the device in FIG. 1.
Figure 6:
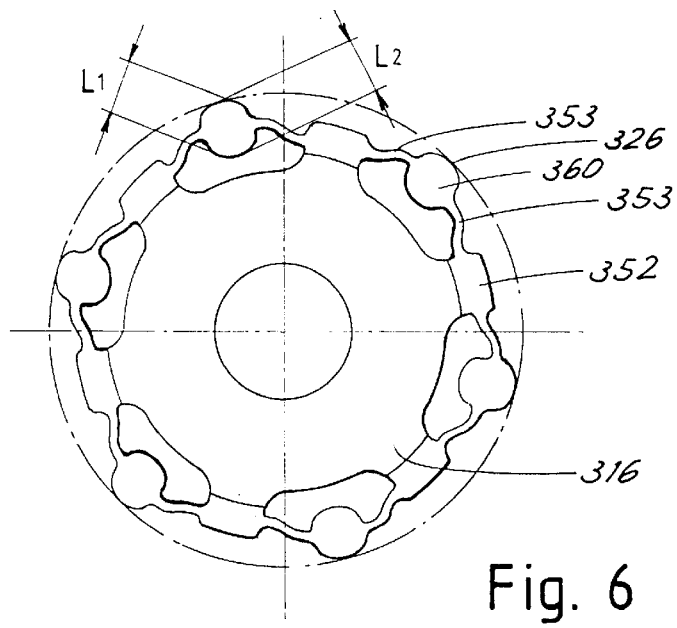
FIG. 6 shows an element of the variant in FIG. 5.

In FIGS. 5 and 6 a further embodiment of the central disc (denoted at 316) is shown which allows a single piece of plastic material to be used, so that rollers or wedges and separated spring elements are eliminated. In this embodiment the disc 316 has radial bulges 352 (at least three in number) disposed in axial symmetry. The bulge ends have a reduced thickness as compared with the remaining part of the disc.

Housed in the space between two bulges in succession are one-way locking elements 326 connected to the side edges of the bulges close thereto by means of one or more elastic connections or elastically twistable bands 353. Elements 326 can thus rotate at least through a small angle around an axis 360 parallel to the two facing surfaces 327, 328. The locking elements 326 have a "squashed" cylindrical shape so that they have a distance between parallel tangent planes that varies in an approximately linear manner with the angle of the tangent planes themselves so as to have a first transverse dimension and a second transverse dimension in two angled directions around said rotation axis of the wedging element, the first dimension (L1) being greater than a distance between the two surfaces and the second dimension (L2) being smaller than such a distance. As clearly shown in FIG. 6 (where the disc has the locking elements in a released position, the smaller distance (identified by L1) is lower than the difference between the radii of surfaces 327 and 328, whereas the greater distance (identified by L2) is surely higher. By exploiting the elasticity of connections 353, the disc can be designed with a shape adapted for injection moulding (FIG. 6). On mounting in the seat within crown 315, elements 326 can be bent so that they are snugly housed in the space defined within the crown and the surface 327 of the central disc. In use, by rotating lever 312 anticlockwise, crown 315 is independent of disc 316. By reversing the rotation direction elements 326 are dragged along by friction in a clockwise rotation and they are subjected to wedging between the inside of the crown and surface 327, thereby operating the friction brake acting on disc 316.

Figure 8:
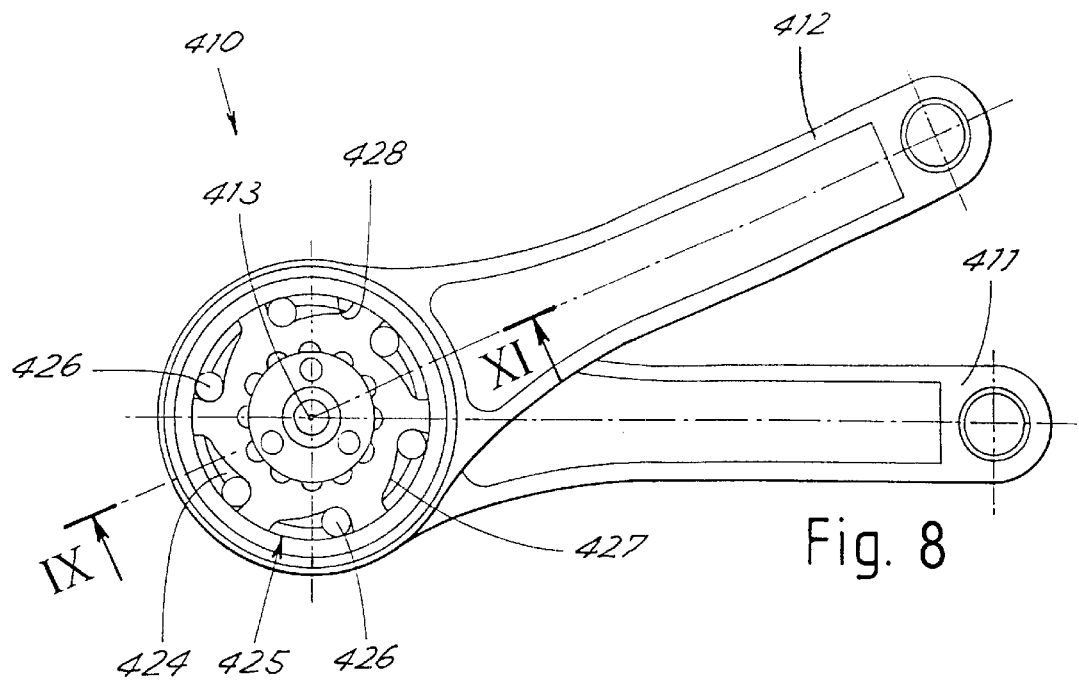
FIG. 8 is a partial plan view of a fourth device in accordance with the invention.

Shown in FIG. 8 is another embodiment of a device intended for use in the braked movement of furniture doors with a horizontal rotation axis, and made in accordance with the invention.

The device 410 comprises two attachment pieces or arms 411, 412 designed to be fastened to the door and the piece of furniture respectively, as known to a person skilled in the art, and which are pivotally mounted in mutual relationship so as to rotate around a common rotation axis 413. As clearly shown in FIG. 9 too, one of the arms radially projects from a circular metal crown 415 which is closed on one side thereof by a disc 414 from which the other arm coaxially projects.

The other side of the crown is closed by a lid 417 which is connected to the closing disc 414 to rotate integrally therewith. For connection, the lid centrally has a cylindrical projection 418 at the end of which pins 419 jut out, which pins fit into corresponding seats in the closing disc 414. Fitting is carried out in a slidable manner parallelly of axis 413, so that the disc and lid can move towards each other being pushed by a compression spring 423 mounted under the head of a closing screw 422.

Received within the crown is a disc-shaped element 416 that can rotate being fitted on the cylindrical projection 418. Defined between facing side surfaces 428 and 427 of the crown and disc-shaped element are hollow spaces 424 receiving wedging elements 426 resting against such facing surfaces.

The extension of the facing surfaces and/or the shape of the wedging element between the latter are of such a nature that the wedging element tends to fit between the facing surfaces making them integral in rotation, when the rotation of the two attachment pieces takes place in the direction involving a braked movement. Thus a one-way wedging device 425 is made.

Advantageously, the hollow spaces 424 are circumferentially extended around the rotation axis 413 and they narrow until they reach a dimension smaller than that of the wedging element in the braked-movement direction. The wedging element is made in the form of a cylinder parallel to the two facing surfaces to rest against them with its cylindrical surface.

The disc-shaped element 416 is made up of a first component (made of plastic or other appropriate material having the desired friction features) defining two first friction surfaces 474 and 475 on opposite faces of the disc-shaped element, and of a metal insert 471, integral with the first component, defining the side rest surface 427.

Figure 10:
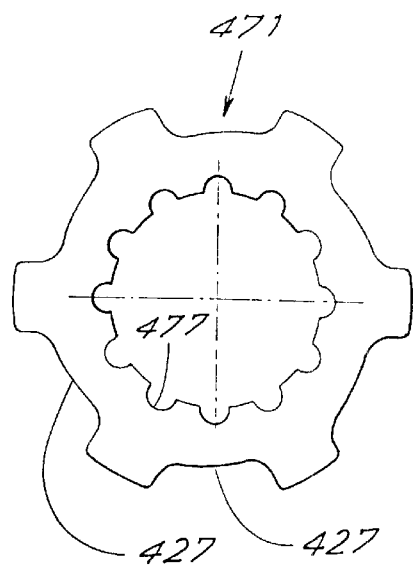
FIGS. 10 and 11 are plan views of details of the device shown in FIG. 8.

Advantageously, the rest surface 427 for each wedging element 426 is the bottom of a cavity formed in the peripheral surface of insert 471, as clearly shown in FIG. 10.

Figure 11:
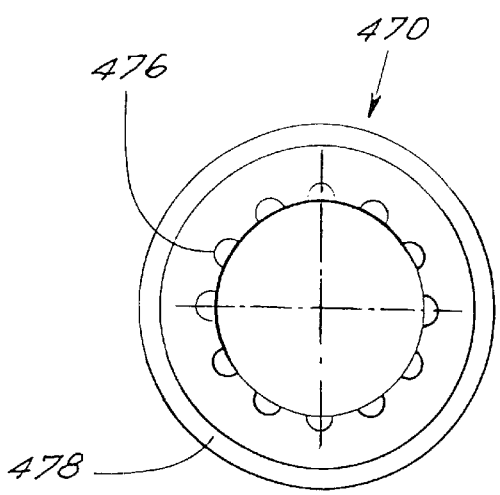
Figure 12:
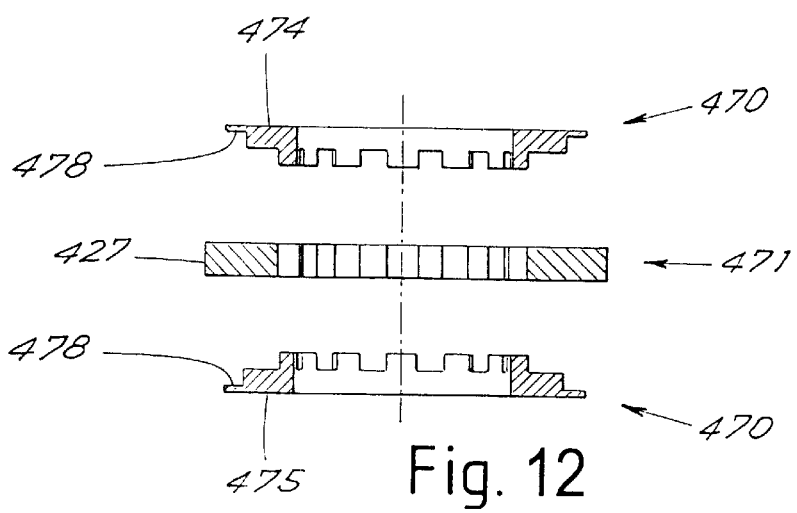
FIGS. 12 and 13 show an exploded view and an assembled view respectively of a central element of the device in FIG. 8.
Figure 13:
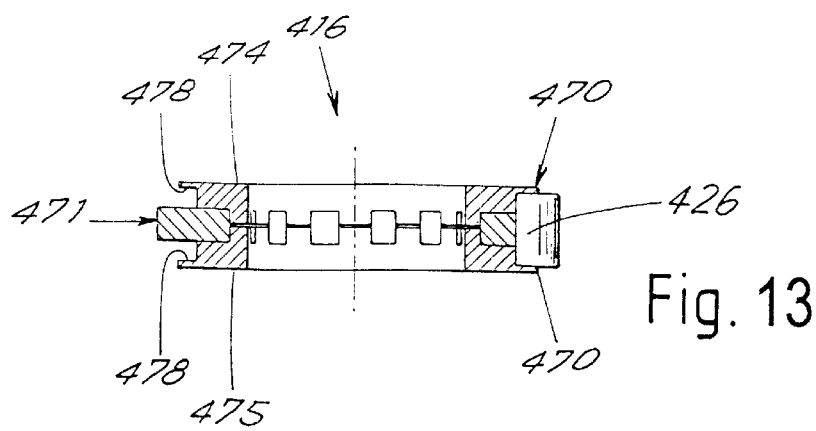

Advantageously, as shown in FIGS. 11 and 12, the first component is made up of two further disc-shaped elements 470 (advantageously identical) fitting into each other on opposite faces of insert 471 by means of shaped projections 476 that are received in appropriate seats 477 in a central hole of insert 471, made up in the form of a ring. Still advantageously, edges 478 of the disc-shaped elements radially project on the two sides of the hollow spaces to receive the wedging elements at least partly and guide them laterally.

Figure 9:
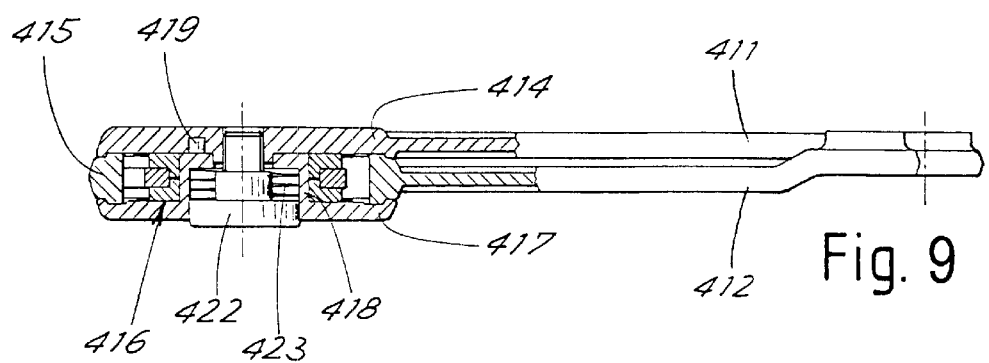
FIG. 9 is a partly sectional view taken along line IX—IX in FIG. 8.

As shown in FIG. 9, the facing inner surfaces of disc 414 and lid 417 (that can also be suitably worked) exert an elastic pressure against the friction surfaces 474 and 475 of the disc-shaped element 416. By adjusting tightening of screw 422 it is possible to adjust the resistance exerted by the friction joint thus made to rotation of arms 411 and 412.

At this point it is apparent that stout and efficient devices have been obtained which have a precise braking force in one direction (when the wedging elements fit into the hollow spaces) and freedom of rotation in the other direction (when the wedging elements move towards the wider region of the hollow spaces).

Figure 7:
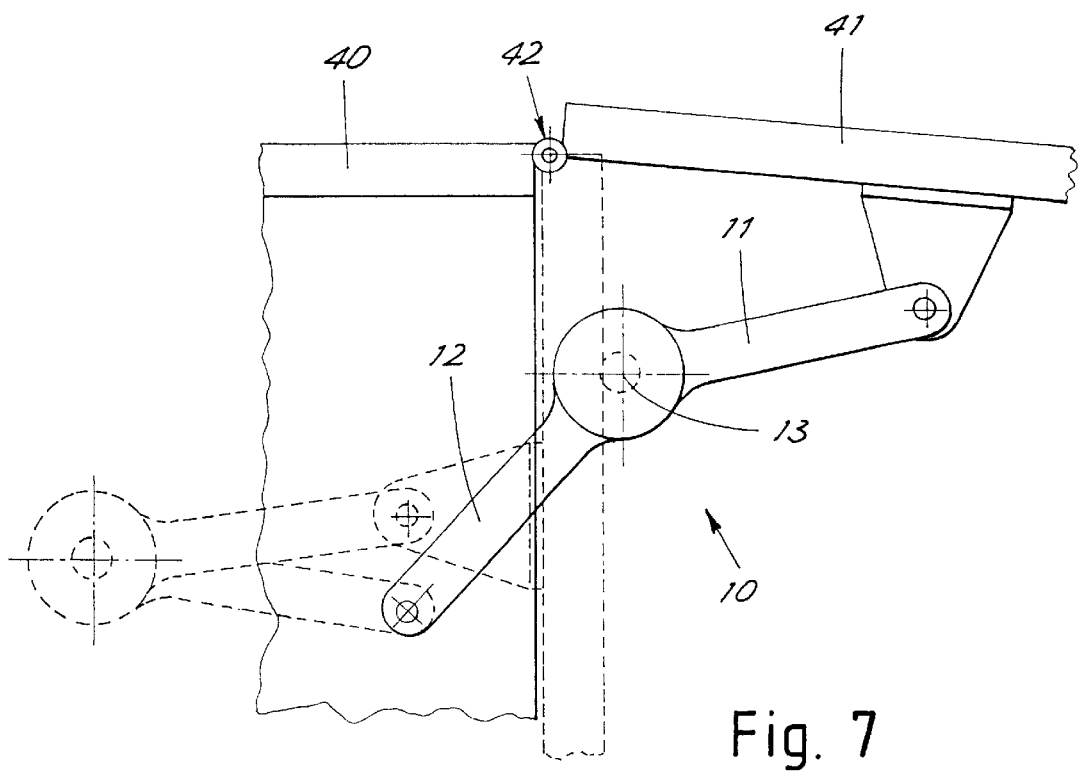
FIG. 7 is a diagrammatic side view showing a possible use of the device in FIG. 1.

As already said, a device as described can be applied to any opening mechanism with a horizontal rotation axis. Shown in FIG. 7 by way of example is an application in which the device has one of the two levers 11, 12 pivotally mounted on the furniture structure 40 and the other lever pivotally mounted to a door 41 in turn hinged at the top (by means of known hinges 42, also of the single-pivot type) to the piece of furniture itself. In order to better show operation of the system, the door is shown in an open position (solid line) and in a closed position (chain line).

As is obvious to a person skilled in the art, the same device can be employed in other opening kinematic mechanisms having a horizontal axis of the known art such as for example a kinematic mechanism of the four-bar linkage type, by suitably replacing one of the rotation axes of the kinematic mechanism with the one-way braking device.

Since the device operates by means of "wedged elements" it is noiseless and has a minimum operating slack. Obviously, the above description of embodiments applying the innovative principles of the present invention is given for purposes of illustration only and is not to be considered as a limitation of the scope of the patent rights herein claimed.

For instance, the number of the hollow spaces and elements designed to lock rotation in one way can be different from that shown in the drawings. In addition, the length and shape of the arms can vary depending on requirements. In the device in FIG. 8 the braking surface of the disc-shaped element at the inside of the crown may consists of one surface alone. In addition, the component forming the braking surfaces can also be obtained by plastic moulding of one piece construction wherein the metal insert is incorporated.

What is claimed is:

1. A device for a braked movement of furniture doors that have a horizontal rotation axis, said device comprising:
   a) a friction joint having a rotation axis;
   b) first and second attachment pieces mutually rotatable in opposite rotation directions around said rotation axis in a free manner in one rotation direction and against a resisting force in the other rotation direction;
   c) said friction joint including a wedging device provided between said attachment pieces to provide the resisting force in the other rotation direction;
   d) said wedging device comprising a first surface integral with one of said attachment pieces and a second surface integral with said friction joint;
   e) said first and second surfaces forming facing surfaces to delimit a space therebetween;
   f) a wedging element disposed within said space;
   g) at least said facing surfaces defining a course between them or the shape of said wedging element is such that said wedging element tends to fixedly fit between said facing surfaces so that said facing surfaces are caused to rotate together with each other when rotation of said two attachment pieces takes place in the other rotation direction;
   h) a circular crown having a center in said rotation axis of said attachment pieces, with one of said attachment pieces radially projecting from said circular crown;
   i) one of said facing surfaces comprising an inner surface said circular crown;
   j) a disc-shaped element disposed coaxial with and central to said circular crown;
   k) the other of said facing surfaces comprising a side surface of said disc-shaped element; and
   l) a closing disc closing a face of said circular crown, the other of said attachment pieces radially projecting from said closing disc, a face of said closing disc turned towards the inside of said circular crown being a friction surface elastically pushed against a faced surface of said disc-shaped element to provide the resisting force when turned in the other rotation direction.

2. A device as claimed in claim 1, wherein said space is a channel which is shaped such that said channel narrows to a size which is smaller than the size of said wedging element.

3. A device as claimed in claim 2, and further comprising a plurality of said wedging element disposed around said rotation axis of said attachment pieces, each wedging element being received in said space comprising a hollow space partially circumferentially extending around said rotation axis.

4. A device as claimed in claim 2, wherein:
   a) said wedging element is made in the form of a cylinder; and
   b) said cylinder is received in said channel such that the cylinder axis is disposed parallel to said facing surfaces.

5. A device as claimed in claim 2, wherein said wedging element is in the form of a wedge narrowing in the narrowing direction of said channel.

6. A device as claimed in claim 2, and further comprising:
   a) elastic means disposed within said channel; and
   b) said wedging element is biased by said elastic means in the narrowing direction of said channel.

7. A device as claimed in claims 6, wherein said elastic means are of one piece construction with said disc-shaped element.

8. A device as claimed in claim 1, wherein:
   a) said disc-shaped element includes cavities formed along the peripheral portion thereof;
   b) said side surface of said disc-shaped element forms a bottom of said cavities; and
   c) each cavity contains a wedging element.

9. A device as claimed in claim 8, wherein:
   a) said wedging element is rotatable around an axis parallel to said facing surfaces;
   b) said wedging element has a first transverse dimension (L1) and a second transverse dimension (L2) in two angled directions around said parallel axis;
   c) said first dimension being greater than a distance between said facing surfaces and said second dimension being smaller than said distance; and
   d) said wedging element includes elastic supports between said facing surfaces so that when rotation of said attachment pieces occurs in the other rotation direction, said wedging element is urged to rotate around said parallel rotation axis so that it is subjected to wedging between said facing surfaces.

10. A device as claimed in claim 9, wherein said elastic supports include elastically twistable bands connected to ends of said cavities of said disc-shaped element for rotation of said wedging element around said parallel axis.

11. A device as claimed in claim 10, wherein said wedging element, disc-shaped element and elastically twistable bands are made of plastic material and are of one piece construction.

12. A device as claimed in claim 1, wherein said disc-shaped element is elastically sandwiched between friction surfaces.

13. A device as claimed in claim 1, and further comprising:
   a) a lid to close the other face of said crown;
   b) said lid rotates fixedly with the rotation of said closing disc; and
   c) said lid forming with a surface thereof turned towards the inside of said crown a friction surface elastically pushed against a faced surface of said disc-shaped element.

14. A device as claimed in claim 13, and further comprising:
   a) a closing screw passing axially through said closing disc and said lid; and
   b) a thrust spring operably associated with said closing screw fitted for elastic compression of said disc-shaped element so that the resisting force can be adjusted by tightening said screw to a greater or smaller extent.

15. A device as claimed in claim 13, wherein:
   a) said disc-shaped element comprises at least a first component defining on at least one face thereof a first friction surface; and
   b) an insert fixedly secured to said first component, said insert defining one of said facing surfaces for said wedging elements.

16. A device as claimed in claim 15, wherein:
   a) said first component consists of two disc-shaped parts, each one having said first friction surface;
   b) said insert includes seats in a cental hole; and
   c) said parts include projections that fit on opposite faces of said insert in the corresponding seats.

17. A device as claimed in claim 15, wherein:
   a) said insert is made in the form of a ring;
   b) said insert includes cavities formed along a peripheral portion thereof; and
   c) one of said facing surfaces is a bottom of said cavities.

18. A device as claimed in claim 13, wherein:
   a) disc-shaped element defines two first friction surfaces on opposite faces thereof; and
   b) said disc-shaped element is elastically compressed between said friction surface of said closing disc and said lid.

19. A device as claimed in claim 1, wherein said attachment pieces are made in the form of arms radially projecting with respect to said rotation axis.

* * * * *